May 17, 1949. R. A. ACKLEY 2,470,452
RATIO CONTROL DEVICE
Filed Sept. 26, 1947

Inventor:
Robert A. Ackley,
By Dawson, Booth & Spangenberg,
Attorneys.

Patented May 17, 1949

2,470,452

UNITED STATES PATENT OFFICE 2,470,452

RATIO CONTROL DEVICE

Robert A. Ackley, Chicago, Ill., assignor to Republic Flow Meters Company, Chicago, Ill., a corporation of Illinois Application September 26, 1947, Serial No. 776,274

5 Claims. (Cl. 137—153)

This invention relates to ratio control devices and more particularly to devices for variably adjusting the ratio between two forces such as fluid pressures.

It is one of the objects of the invention to provide a ratio control device which is simple to construct and which will accurately vary the ratio between two pressures or other forces through a wide range.

Another object is to provide a ratio control device in which the effective leverages of a pair of arms can easily and quickly be changed by changing the angle of a strut engaging concentric surfaces on the arms.

The above and other objects and advantages of the invention will be more readily apparent from the following description when read in connection with the accompanying drawing in which—

Figure 1:
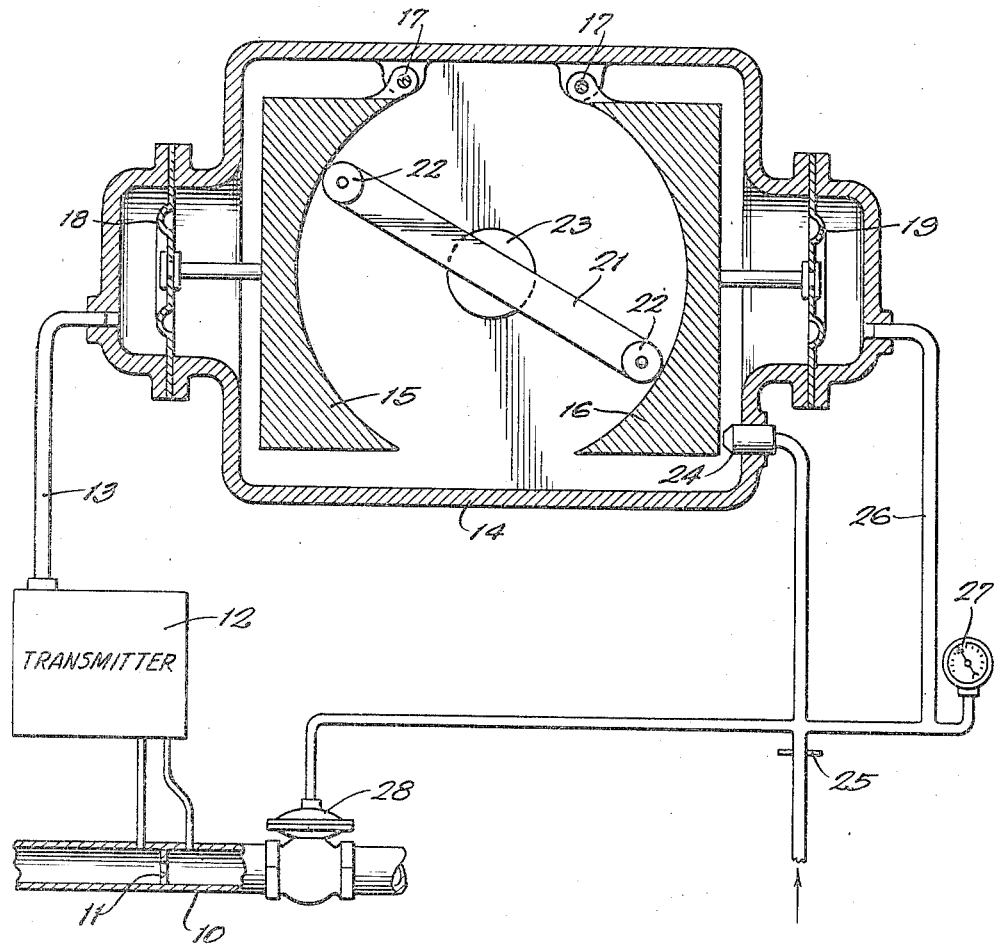
Figure 2:
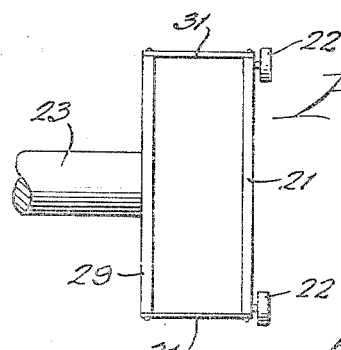

Figure 1 is a diagrammatic view with parts in section of a ratio control device embodying the invention; and Figure 2 is a partial side elevation of the strut supporting mechanism.

The device, as shown, is adapted to control or to indicate the flow through a conduit although it could equally well be employed to indicate or control various other physical conditions such as temperature, pressure, density, various chemical processes, or the like. In the embodiment shown, the flow through a conduit 10 is to be controlled and, for this purpose, the conduit is provided with a restricted orifice 11. The opposite sides of the orifice are connected to a transmitting instrument indicated generally at 12 which may be of the type described and claimed in the patent to Rosenberger No. 2,354,423. This transmitting instrument, as described in the Rosenberger patent, will produce a fluid pressure which is proportional to the condition to be measured as, for example, the rate of flow through the conduit 10. This pressure is transmitted through a pipe 13 to the ratio controlling device of the present invention.

The ratio controlling device is adapted to produce a pressure having a predetermined ratio to the pressure supplied to it through the pipe 13 to indicate or control the flow through the conduit 10. As shown, the ratio controlling device comprises a casing 14 in which a pair of arms 15 and 16 are pivoted. The arms are formed with concentric facing surfaces and are pivoted at 17 on pivots lying closely adjacent to extensions of such surfaces. With this arrangement, the surfaces will remain concentric or substantially concentric through a relatively small movement of the arms which is required for operation of the device. At its ends, the casing is extended to provide chambers for flexible diaphragms 18 and 19 which are connected respectively to the arms 15 and 16 to urge them about their pivots in response to the force exerted by the diaphragms. The pipe 13 is connected to the outer surface of the diaphragm 18 to urge it and the arm 15 toward the arm 16.

Force is transmitted between the arms by means of a strut 21 having rollers 22 at its ends to engage the arcuate surfaces on the arms. The strut is carried by a rotatable hub 23 which is concentric with the arcuate surfaces on the arms. By turning the hub, the effective leverage ratio between the arms can be changed, and since the facing surfaces engaged by the ends of the strut are concentric, turning of the hub will not produce any movement of the arms.

The diaphragm 19 is adapted to exert a force on the arm 16 to balance the force of the diaphragm 18 on the arm 15. For this purpose, a fluid discharge nozzle 24 is mounted adjacent the arm 16 to be variably restricted by the arm 16 as it moves. The nozzle may be supplied with air or other fluid under pressure from any suitable source through a restriction 25 so that the pressure back of the nozzle will be variably regulated in accordance with movement of the arm 16. The regulated pressure may be conducted to the diaphragm 19 through a pipe 26 and may also be conducted to a pressure responsive indicating device 27 and to a pressure operated control valve 28 in the conduit 10.

The strut is mounted for free longitudinal movement to transmit force between the levers and for turning with the hub as best seen in Figure 2. As shown, the hub rigidly carries a cross bar 29 which is the same length as the strut. Leaf springs 31 are connected at their ends to the ends of the cross bar 29 and the strut to provide a flexible parallelogram support for the strut. Thus the strut will turn with the hub 23 and is free to move lengthwise substantially without friction.

In operation, when the parts are in balance, the arms 15 and 16 will occupy the center position shown and the pressures exerted on the diaphragms 18 and 19 will be in a ratio predetermined by the angular setting of the strut 21. Upon a variation in flow through the conduit, the pressure on the diaphragm 18 will change so that the levers 15 and 16 will move to vary the regulated pressure back of the nozzle 24. It will be noted that this movement is very slight, requiring only a few thousandths movement of the lower end of the arm 16 between full opening and full closing of the nozzle so that the facing surfaces on the arms remain substantially concentric at all times. The changed regulated pressure back of the nozzle 24 will change the force exerted by the diaphragm 19 an amount sufficient to rebalance the system, the pressures acting on the two diaphragms always being maintained in the same ratio. This pressure will also act on the indicating device 27 to indicate the changed flow rate and may control the valve 29 to adjust the flow to the desired value.

To change the ratio between the input and output pressures of the device, it is necessary only to turn the hub 23 to adjust the angle of the strut 21. In the position shown, the output pressure acting on the diaphragm 19 is substantially smaller than that acting on the diaphragm 18 although by turning the strut, this condition could be reversed or the pressures could be made equal if desired. It will thus be seen that a large range of pressure ratios can easily be obtained and that the set ratio will be accurately maintained.

While one embodiment of the invention has been shown and described in detail, it will be understood that it is illustrative only and is not intended to be a definition of the scope of the invention, reference being had for this purpose to the appended claims.

What is claimed is:

1. A ratio control device comprising a pair of movably mounted members having concentrically curved facing surfaces, a compression strut mounted for pivotal movement about the center of said surfaces and for longitudinal movement, the ends of the strut engaging the surfaces respectively, means to urge one of the members toward the other, and means responsive to movement of the members to urge said other member toward said one member to balance the first named means.

2. A ratio control device comprising a pair of movably mounted members having concentrically curved facing surfaces, a compression strut mounted for pivotal movement about the center of said surfaces and for longitudinal movement, the ends of the strut engaging the surfaces respectively, a pair of fluid pressure responsive elements connected to the members respectively to urge them together, means responsive to a condition to supply fluid pressure to one of the elements, and means responsive to movement of the members to supply fluid pressure to the other element.

3. A ratio control device comprising a pair of pivotally mounted arms having concentrically curved facing surfaces, a rotatable hub concentric with said surfaces, a strut movably carried by the hub transverse to its axis and engaging the surfaces at its ends, means to urge one member toward the other, and means responsive to movement of the arms to urge said other member toward said one member.

4. A ratio control device comprising a pair of pivotally mounted arms having concentrically curved facing surfaces, a rotatable hub concentric with said surfaces, a strut movably carried by the hub transverse to its axis and engaging the surfaces at its ends, a pair of fluid pressure responsive elements connected to the members respectively to urge them together, means responsive to a condition to supply fluid pressure to one of the elements, and means responsive to movement of the arms to supply fluid pressure to the other element.

5. A ratio control device comprising a pair of pivotally mounted arms having concentrically curved facing surfaces, a rotatable hub concentric with said surfaces, a strut movably carried by the hub transverse to its axis and engaging the surfaces at its ends, a pair of fluid pressure responsive elements connected to the members respectively to urge them together, means responsive to a condition to supply fluid pressure to one of the elements, a nozzle mounted adjacent the arms and which is variably restricted by movement of the arms to produce a regulated pressure and a connection from the nozzle to the other element to supply the regulated pressure thereto.

ROBERT A. ACKLEY.

No references cited.